United States Patent [19]  [11] 4,278,805
Merger et al.  [45] Jul. 14, 1981

[54] PROCESS FOR THE PREPARATION OF AN ARYL MONO-, DI-, AND/OR POLYURETHANE

[75] Inventors: Franz Merger, Frankenthal; Friedrich Towae, Ludwigshafen, both of Fed. Rep. of Germany

[73] Assignee: BASF Aktiengesellschaft, Rheinland-Pfalz, Fed. Rep. of Germany

[21] Appl. No.: 135,246

[22] Filed: Mar. 31, 1980

[30] Foreign Application Priority Data

Oct. 29, 1979 [DE] Fed. Rep. of Germany ....... 2942510

[51] Int. Cl.$^3$ .............. C07C 125/07; C07C 125/077; C07C 125/063
[52] U.S. Cl. ........................................ 560/25; 560/24; 560/27; 560/28; 560/29; 560/30; 560/31; 560/32; 560/22
[58] Field of Search ....................... 560/24, 25, 27, 28, 560/29, 30, 31, 32, 22

[56] References Cited

U.S. PATENT DOCUMENTS 2,409,712  10/1946  Schweitzer ........................... 560/24
2,806,051  9/1957  Brockway ............................. 560/24

Primary Examiner—G. T. Breitenstein
Attorney, Agent, or Firm—David L. Hedden; Joseph D. Michaels

[57] ABSTRACT

A process for the preparation of an aryl-mono and/or polyurethane comprising the steps of A. reacting a primary aromatic mono, di-, and/or polyamine with an O-alkyl carbamate in the presence of alcohol and catalysts, and
B. separating the ammonia and other by-products from the aliphatic and/or cycloaliphatic di- and/or polyurethane.

The reaction is preferably carried out in the presence of urea. The aryl mono-, di-, and/or polyurethanes produced are valuable end and intermediate products. They can be transferred into the corresponding isocyanates which can then be used for the preparation of polyurethanes.

12 Claims, No Drawings

PROCESS FOR THE PREPARATION OF AN ARYL MONO-, DI-, AND/OR POLYURETHANE

BACKGROUND OF THE INVENTION

1. Field of the Invention

The invention pertains to the preparation of an aryl mono-, di- and/or polyurethane by reacting a primary aromatic mono-, di- and/or polyamine with an O-alkyl carbamate in the presence of an alcohol and catalysts. The reaction is preferably carried out in the presence of urea.

2. Description of the Prior Art

On an industrial scale, N-aryl urethanes are normally produced by the reaction of alcohols with isocyanates or by the reaction of amines with chlorocarbonates. The isocyanates and chlorocarbonates used in these reactions are obtained by phosgenation of the corresponding amines or the corresponding alcohols. Houben-Weyl, *Methods of Organic Chemistry*, Vol. 8, pages 137, 120 and 101, (Georg Thieme Publishers, Stuttgart, 1952). These processes are very expensive and phosgene must be used with care because of its potential danger to man and the environment.

N-aryl urethanes are used as intermediates and end products. For instance, German Published Application No. 26 35 490 and U.S. Pat. No. 3,919,278 disclose the use of N-substituted urethanes for the manufacture of isocyanates. Because of their utility, many attempts have been made to develop better methods for preparing N-substituted urethanes. These methods and their shortcomings will be discussed.

German Published Application No. 21 60 111 describes a process for the manufacture of N-substituted urethanes by reacting an organic carbonate with a primary or secondary amine in the presence of a Lewis acid. There are several problems with this process. The conversion rates are rather low and the reaction times are long. Furthermore, N-alkyl-arylamines are always produced as by-products.

U.S. Pat. No. 2,834,799 describes a process for making carbamic and carbonic esters by the reaction of urea with alcohols in the presence of boron trifluoride. The problem with this method is that the boron trifluoride is required in equimolar quantities so that at least one molecule of boron trifluoride is used per molecule of produced carbamic ester and at least two molecules of boron trifluoride are consumed per molecule of carbonic ester. This process is not only expensive, but it causes problems in the environment because the boron trifluoride is produced in the form of the $H_3N \cdot BF_3$ adduct.

R. A. Franz et al, *Journal of Organic Chemistry*, Vol. 28, page 585 (1963) describe a process for making methyl-N-phenyl urethane from carbon monoxide, sulfur, aniline, and methanol. Very low yields are produced by this method; the yield does not exceed 25 percent even when there is a long reaction period.

U.S. Pat. No. 2,409,712 describes a process for making N-alkyl and N-aryl urethanes by the reaction of monoamines with urea (either N,N'-dialkyl- or N,N'-diarylurea is used) and alcohols at temperatures of 150° C. to 350° C. under increased pressure. It should be noted that this patent only describes the manufacture of N-alkylmonourethanes and does not mention the manufacture of N,N'-disubstituted diurethanes and polyurethanes. U.S. Pat. No. 2,677,698 also describes a process for the manufacture of N-substituted monourethanes. In this process, the urea is initially converted into the corresponding N,N'-disubstituted urea with monoamines, is then cleaned, and subsequently is reacted with an alcohol. The processes described are expensive and the yields are very low. Attempts to improve the yield by improving the methods of preparing and purifying the N,N'-disubstituted ureas have been unsuccessful.

Other processes have not been successful in eliminating the problems described thus far. U.S. Pat. No. 2,806,051 describes a process whereby N-substituted urethanes are produced by reacting aniline with urea and alcohol at a mole ratio of 1.0:1.2:2.0 at temperatures below 200° C., preferably of 120° C. to 160° C. Even in the preferably used temperature range, this process produces only small yields of N-substitued urethanes if the reaction time is limited to a period which is practical in an industrial setting. In view of the problems with this process, it is not surprising that U.S. Pat. No. 3,076,007, which describes the manufacture of N-alkyl- and N-cycloalkyl urethanes, does not incorporate the above-referenced methods in its process. It does, however, describe the reaction of phosgene with alcohols to form chloroalkylformates, and it describes their subsequent reaction with amines to form urethanes. It also discloses the reaction of amines with ethylene carbonate to form urethanes. German Published Application No. 27 16 540 describes a more recent variation of this process wherein aromatic urethanes are prepared by reacting dialkyl carbonates with N-ethyl amines.

It is also known that ethyl carbamates do not react with amines in boiling dioxane [D. G. Crosby and C. Niemann, *Journal of the American Chemical Society*, Vol. 76, page 4458 (1954)], and that the reaction of N-alkyl urethanes with alcoholic ammonia solutions at temperatures of 160° C. to 180° C. result in an alkali solution from which aminohydrochloride, urea, alkylurea and alkyl urethane can be isolated by means of hydrochloric acid after neutralization [M. Brander, *Rec. trav. Chim.*, Vol. 37, pages 88–91 (1917)]. The referenced publications do not contain any disclosure concerning the reaction of aromatic primary amines with carbamates although it is known that the heating of ethyl carbamate with aniline at 160° C. in a bomb tube will produce diphenylurea. See *Annalen*, Vol. 147, page 163 (1868).

U.S. Pat. No. 2,409,712, discloses that the reaction of aliphatic monoamines, urea and alcohol will produce alkyl urethanes. However, only small yields result even though excess urea is used. Since somewhat higher yields are achieved with less urea and at lower temperatures according to U.S. Pat. No. 2,806,051, one has to assume that higher mole ratios of urea to amines are disadvantageous. Diphenylurea and O-alkyl carbamate were determined as by-products of the synthesis of phenylurethane. The O-alkyl carbamate was isolated by means of distillation in addition to unreacted aniline. The formation of O-alkyl carbamate from urea and alcohol was therefore considered as an interferring secondary reaction. Since even the manufacture of N-monoalkylsubsituted urethanes from alkylamines, urea, and alcohols succeeds with moderate yields only, and since carbamates are produced as by-products, it is not surprising that the prior art does not teach the preparation of aryl mono-, di- and/or polyurethanes from arylamines and O-alkyl carbamates.

Because of the problems identified thus far, other methods of producing N-arylurethanes have been tried.

Some have suggested that N-arylurethanes can be prepared by reacting nitroaromatics with carbon monoxide, and alcohols in the presence of catalysts. German Published Application No. 15 68 044 (U.S. Pat. No. 3,467,694) teaches that urethanes may be prepared by the reaction of organic nitro compounds, carbon monoxide, and hydroxyl-containing compounds in the presence of a catalysts consisting of a noble metal and a Lewis acid under essentially anhydrous conditions in the absence of hydrogen under increased pressure and at temperatures above 150° C. German Published Application No. 23 43 826 (U.S. Pat. No. 3,895,054)teaches that urethanes can be prepared from hydroxyl group-containing compounds, carbon monoxide, and nitro-, nitroso-, azo- and azoxy group-containing compounds in the presence of sulfur, selenium, a sulfur and/or selenium compound and at least one base and/or water. German Published Application No. 26 23 694 (U.S. Pat. No. 4,080,365) describes the preparation of aromatic urethanes from the above-referenced starting compounds in the presence of selenium-containing catalyst systems as well as special aromatic amino and urea compounds. However, the use of these processes involve serious drawbacks. The toxic carbon monoxide and catalysts which are toxic or form toxic compounds during the reaction, such as hydrogen selenide and hydrogen sulfide, or catalysts which are very expensive and are difficult to recycle such as palladium, require great technical expenditure and costly safety measures.

None of the references cited discloses the preparation of aryl mono, di and/or polyurethane by reacting an aromatic amine with an O-alkyl carbamate in the presence of an alcohol and catalysts at temperatures greater than 120° C. Moreover, the processes described all involve several disadvantages. It is surprising that aryl mono, di and/or polyurethanes can be produced in one process stage with good yields by reacting carbamates with primary aromatic amines in the presence of alcohol and catalysts at temperatures greater than 120° C. Prior teachings indicate that corresponding diureas are obtained from diamines and carbamates; for example, hexamethylenediurea is obtained from hexamethylenediamine and carbamates. Prior art also teaches that, although urea and alcohol may react to produce urethanes, they continue to react to form N,N'-disubstituted ureas in the presence of amines. See Houben-Weyl, *Methods of Organic Chemistry*, Vol. 8, pages 152, 140, and 160, (Georg Thieme Publishers, Stuttgart, 1952). These side reactions decrease the yield of the desired product.

Furthermore, German Pat. No. 896 412 indicates that high molecular, spinnable condensation products may be produced from the diamides of carbonic acid such as urea and diamines. This result is likely to occur if the amino groups of the diamines are separated by a chain of more than three atoms. U.S. Pat. No. 2,181,663 and U.S. Pat. No. 2,568,885, for instance, disclose that high molecular polyureas with molecular weights of 8000 to 10,000 and greater, may be produced when diurethanes are condensed with diamines at temperatures of approximately 150° C. to 300° C. Moreover, mono- and polyurethanes can furthermore be split thermally into isocyanates, alcohols and possibly olefins, carbon dioxide, urea and carbodiimide, and these products can be split into products such as biurets, allophanates, isocyanurates, polycarbodiimides, and others. See *The Journal of the American Chemical Society*, Vol. 80, page 5495 (1958) and Vol. 48, page 1946 (1956).

In view of the problems disclosed in the prior art, it was surprising that our process, which involved very similar reaction conditions, would result in a mono-, di- and/or polyurethane with very good yields. It was particularly surprising because when diurethanes were prepared from the products mentioned in the previous paragraph according to the reaction conditions of our invention, good yields did not result.

SUMMARY OF THE INVENTION

The purpose of this invention was to produce an aryl mono-, di-, and/or polyurethane from readily available raw materials in one reaction stage under economically justifiable conditions with good yields. The use of strongly toxic raw materials such as phosgene, carbon monoxide, or catalysts which are toxic and form toxic compounds during the reaction, such as hydrogen sulfide, was to be avoided.

The problem was solved by developing a process for the preparation of aryl mono-, di-, and/or polyurethanes comprising the steps of A. reacting a primary aromatic mono-, di-, and/or polyamine with an O-alkyl carbamate in the presence of an alcohol and at least one compound containing one or more cations of metals of groups IA, IB, IIA, IIB, IIIA, IIIB, IVA, IVB, VA, VB, VIB, VIIB, and VIIIB of the periodic system as catalysts, and B. separating the ammonia and other by-products from the aryl mono-, di-, and/or polyurethane.

The reaction may be illustrated by the following equation I:

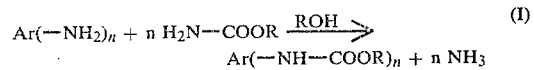
$$Ar(-NH_2)_n + n\ H_2N-COOR \xrightarrow{ROH} Ar(-NH-COOR)_n + n\ NH_3 \quad (I)$$

However, the reaction is preferably carried out in the presence of urea according to equation (II):

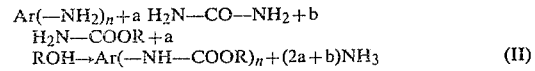
$$Ar(-NH_2)_n + a\ H_2N-CO-NH_2 + b\ H_2N-COOR + a\ ROH \rightarrow Ar(-NH-COOR)_n + (2a+b)NH_3 \quad (II)$$

In equations (I) and (II), n, a, and b stand for whole numbers with n representing 1–7, preferably 1–5, and in which, according to (II), a+b equals n and a:n equals 1.5–0.

The aryl mono-, di-, and/or polyurethanes produced according to the process of this invention are valuable end and intermediate products. They are used, for instance, as pesticides. As intermediate products, they are used as components for polycondensation and polymer systems and, in particular, they are transformed into the corresponding di- and/or polyisocyanates by removal of the alcohol. The di- and/or polyisocyanates can be used in the manufacture of polyurethanes.

DESCRIPTION OF THE PREFERRED EMBODIMENTS

In order to prepare the aryl mono-, di-, and/or polyurethane in accordance with the process of this invention, a primary aromatic mono, di, and/or polyamine is reacted with an O-alkyl carbamate in the presence of an alcohol and catalysts in such quantities that the ratio of amino groups of the primary aromatic amines to O-alkyl carbamates to the hydroxyl groups of the alcohol is 1:0.5–20:0–100, preferably 1:0.8–10:0–30, and particularly for arylmonourethanes 1:1–6:0–5, and for aryl- diand/or polyurethanes, 1:1–6:2–20. The reaction preferably is carried out in the presence of urea.

It is not necessary to separately produce O-alkyl carbamates in a proceeding process stage. In an easily practiced, preferably used version, the O-alkyl carbamate is used together with urea and alcohol and after extensive to complete reaction of their aromatic mono- and/or polyamines, the O-alkyl carbamate is separated by means of distillation and is recycled if so required. The process according to this invention may also be conducted in a continuous phase.

Unsubstituted or substituted primary aromatic mono-, di- and polyamines are suited for the reaction with the O-alkyl carbamate in the presence of alcohol and in the absence or presence of ureas according to this invention. Representative amines include the following: aromatic monoamines such as aniline, substituted anilines, such as anilines substituted in the 2, 3 and/or 4 position by a nitro-, methyl-, n-propyl-, isopropyl-, n-butyl-, isobutyl-, secondary butyl-, tertiary butyl group or a chlorine atom; ortho-, meta- and/or parahydroxy-, methoxy-, ethoxy-, propoxy-, isopropoxy-, N-butoxy-, isobutyoxy-, secondary butoxy-, and tertiary butoxyaniline; an alkylbenzoate with 1 to 4 carbon atoms in the alkyl radical substituted by an amino group in the n- and/or p- position; N-alkoxycarbonylaminobenzenes and -toluenes with 1 to 4 carbon atoms in the alkyl radical substituted by an amino group in the m- and/or p-position; alpha- and beta-naphthylamine; aromatic diamines such as 1,3- and 1,4-diaminobenzene; 1,3-diaminobenzene substituted in the 2 and/or 4 position by nitro, methyl, ethyl, n-propyl, isopropyl, n-butyl, isobutyl, sec-butyl, tert-butyl, methoxy, ethoxy, n-propoxy, isopropoxy, n-butoxy, isobutoxy, sec-butoxy, tert-butoxy groups or halogen atom, preferably fluorine or chlorine; or 1,4-diaminobenzene, 1,5- and 1,8-diaminonaphthalene, 4,4'-diaminodiphenyl, 2,2'-, 2,4'- and 4,4'-diaminodiphenylmethane and the corresponding isomer mixtures thereof, all of which may be substituted in the 2 position by a nitro, methyl, ethyl, n-propyl, isopropyl, n-butyl, isobutyl, sec-butyl, tert-butyl, methoxy, ethoxy, n-propoxy, isopropoxy, n-butoxy, isobutoxy, sec-butoxy, tert-butoxy group or a halogen atom, preferably a fluorine or a chlorine atom; and polyamines such as 1,3,5-triaminobenzene, 2,4,6-triaminobenzene, and 1,3,5-triaminobenzene and polyphenylpolymethylene polyamines as well as mixtures of diaminodiphenyl methanes and polyphenylpolymethylene polyamines which are produced in accordance with familiar methods by the condensation of aniline and formaldehyde in the presence of preferably mineral acids as catalysts and which may be substituted with any of the above identified groups or atoms.

The following compounds are preferably used as aromatic monoamines: o-, m- and/or p-toluidine, o-, m- and/or p-anisidine, 3-hydroxyaniline, o-, m- and/or p-chloroaniline, 2,4-, 3,4- and 3,5-dichloroaniline, 2-nitro-4-aminotoluene, 4-nitro-2-aminotoluene, 2-nitro-6-amino-toluene, and N-alkoxy-carbonylarylamines having the formula

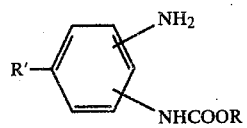

in which R represents a methyl-, ethyl-, propyl-, isopropyl-, n-butyl-, isobutyl-, secondary butyl-, or tertiary butyl- radical and in which R' stands for a hydrogen atom or the radical R as well as particularly aniline, 3,3'-ditolulene-4,4'-diamine, 2,4- and 2,6-toluenediamine as well as the corresponding isomer mixtures, 2,2'-, 2,4'- and 4,4'-diaminodiphenylmethane and the corresponding isomer mixtures, 1,5- and 1,8-naphthalenediamine as aromatic diamines and mixtures of diaminodiphenylmethanes and polyphenylpolymethylene polyamines as polyamines. During the reaction, the amino groups are transformed into alkoxycarbonylamino groups independent of whether or not the remaining substituents remained unchanged or are also converted.

Suitable O-alkylcarbamates for the reaction have the formula $H_2N$-COOR in which R represents an unsubstituted or substituted aliphatic, cycloaliphatic or aromatic-aliphatic radical. Representative examples include O-alkyl carbamates based upon primary aliphatic monoalcohols having 1 to 20 carbon atoms, preferably 1 to 10 carbon atoms such as methyl carbamate, ethyl carbamate, propyl carbamate, n-butyl carbamate, isobutyl carbamate, 2- and 3-methylbutyl carbamate, neopentyl carbamate, pentyl carbamate, 2-methylpentyl carbamate, n-hexyl carbamate, 2-ethylhexyl carbamate, heptyl carbamate, n-octyl carbamate, n-nonyl carbamate, n-decyl carbamate and n-dodecyl carbamate, 2-phenylpropyl carbamate and benzyl carbamate; and O-alkyl carbamates based upon secondary aliphatic and cycloaliphatic monoalcohols having 3 to 15 carbon atoms, preferably 3 to 6 carbon atoms such as isopropyl carbamate, secondary butyl carbamate, secondary isoamyl carbamate, cyclopentyl carbamate, cyclohexyl carbamate, tertiary butylcyclohexyl carbamate, and bicyclo-(2,2,1)-heptyl carbamate. Preferably used are methyl carbamate, ethyl carbamate, propyl carbamate, butyl carbamate, isobutyl carbamate, 2- and 3-methylbutyl carbamate, pentyl carbamate, hexyl carbamate, 2-ethylhexyl carbamate, heptyl carbamate, octyl carbamate, and cyclohexyl carbamate.

Unsubstituted, or substituted, primary or secondary aliphatic alcohols, as well as mixtures thereof, may be used as alcohols. Preferably used is the alcohol which has an alkyl group corresponding with the alkyl group of the O-alkyl carbamate. Representative examples include primary aliphatic alcohols having 1 to 20 carbon atoms, preferably 1 to 10 carbon atoms, such as methanol, ethanol, propanol, n-butanol, 2-methylbutanol, n-pentanol, neopentylalcohol, 2-methylpentanol, n-hexanol, n-heptanol, n-octanol, nonanol, n-decanol, and n-dodecanol; and secondary aliphatic and cycloaliphatic alcohols having 3 to 15 carbon atoms, preferably 3 to 6 carbon atoms, such as isopropanol, secondary butanol, secondary isoamylalcohol, cyclopentanol, 2-, 3- or 4-methylcyclohexanol, cyclohexanol, and bicyclo-(2,2,1)-heptanol. Preferably used as monoalcohols are methanol, ethanol, propanol, n-butanol, isobutanol, 2-ethylbutanol, 2- and 3-methylbutanol, n-pentanol, n-hexanol, 2-ethylhexanol, heptanol, octanol and cyclohexanol. If required, the alcohols may be mixed with other organic solvents which are inert under the reaction conditions.

As already indicated, a preferred process version uses urea in addition to the O-alkyl carbamate for the manufacture of the aryl mono- and/or polyurethanes with the ratio of amino groups of the aromatic amines to the total of O-alkyl carbamate and urea also being 1:0.5–20, preferably 1:0.8–10, and particularly 1:1–6 with the mole ratio of urea to amino groups of the primary, aromatic amines being equal to or less than 1.5, preferably 1.25–0.75, and the mole ratio of urea to hydroxyl groups of the alcohol being equal to or less than 1. The urea is appropriately used in commercially-available form and purity.

In accordance with the invention, the reaction is carried out in the presence of one or more catalysts. Suitable catalysts are inorganic and organic compounds containing one or more, preferably one cation of metals of the groups IA, IB, IIA, IIB, IIIA, IIIB, IVA, IVB, VA, VB, VIB, VIIB and VIIIB of the periodic system defined in accordance with the *Handbook of Chemistry and Physics* (14th edition, Chemical Rubber Publishing Company, 2310 Superior Avenue, N.E., Cleveland, Ohio). These compounds include, for instance, halides such as chlorides and bromides, sulfates, phosphates, nitrates, borates, alcoholates, phenolates, sulfonates, oxides, oxide hydrates, hydroxides, carboxylates, chelates, carbonates and thio- or dithioarbamates. The compounds should contain cations of the following metals: lithium, sodium, potassium, magnesium, calcium, aluminum, gallium, tin, lead, bismuth, antiomony, copper, silver, gold, zinc, mercury, cerium, titanium, vanadium, chromium, molybdenum, manganese, iron, cobalt and nickel. Preferably used are the cations of lithium, calcium, aluminum, tin, bismuth, antimony, copper, zinc, titanium, vanadium, chromium, molybdenum, manganese, iron and cobalt. Without recognizable marked drawbacks, the catalysts may also be used in form of their hydrates or ammoniates.

Examples of typical catalysts include the following compounds: lithium methanolate, lithium ethanolate, lithium propanolate, lithium butanolate, sodium methanolate, potassium-tertiary butanolate, magnesium methanolate, calcium methanolate, tin-(II)-chloride, tin-(IV)-chloride, lead acetate, lead phosphate, antimony-(III)-chloride, antimony-(V)-chloride, aluminum isobutylate, aluminum trichloride, bismuth-(III)-chloride, copper-(II)-acetate, copper-(II)-sulfate, copper-(II)-nitrate, bis-(triphenylphosphineoxido)-copper-(II)-chloride, copper molybdate, silver acetate, gold acetate, zinc oxide, zinc chloride, zinc acetate, zinc acetonylacetate, zinc octoate, zinc oxylate, zinc hexylate, zinc benzoate, zinc, undecylenate, cerium-(IV)-oxide, uranyl acetate, titanium tetrabutanolate, titanium tetrachloride, titanium tetraphenolate, titanium naphthenate, vanadium-(III)-chloride, vanadium acetonylacetate, chromium-(III)-chloride, molybdenum-(VI)-oxide, molybdenum acetonylacetate, tungston-(VI)-oxide, manganese-(II)-chloride, manganese-(II)-acetate, manganese-(III)-acetate, iron-(II)-acetate, iron-(III)-acetate, iron phosphate, iron oxylate, iron-(III)-chloride, iron-(III)-bromide, cobalt acetate, cobalt chloride, cobalt sulfate, cobalt naphthenate, nickel chloride, nickel acetate, and nickel naphthenate as well as their mixtures.

Advantageously, the catalysts are used in quantities corresponding with 0.0001 to 0.1, preferably 0.0005 to 0.05, equivalents of the metal cation relative to the amino groups of the aromatic mono-, di- and polyamines. The metal ions may also be used bonded to ion exchangers in the heterogeneous phase.

The reactions are carried out at increased temperatures, for instance at temperatures of 100° C. to 250° C., preferably 120° C. to 210° C., and particularly 135° C. to 190° C., and under pressures of 0.1 bar to 120 bars, preferably 0.5 bar to 60 bars, and particularly 1 bar to 40 bars. It has proven to be advantageous to remove the resultant ammonia from the resultant mixture, for instance by means of distillation. At a given temperature, the reaction is then preferably carried out under a pressure at which the resultant ammonia can be removed selectively from the reaction mixture by means of distillation. The corresponding values are contained in tables with the physical characteristics of ammonia and alcohols. The reaction times which are appropriate for the above-referenced temperature ranges are 0.5 hour to 100 hours, preferably 1 hour to 50 hours, and particularly 2 hour to 25 hours.

The aryl-mono-, di- and/or -polyurethanes are advantageously produced according to the process of this invention by mixing the reactants in the referenced quantity ratios and in the presence of at least one catalyst. They are then heated, with or without agitation, in a reaction vessel equipped with a device for separating the ammonia. After completed reaction, the resultant ammonia may be separated. Preferably, however, it is removed during the reaction either continuously or by a batch-type operation and by means of distillation. It may be advantageous, particularly during the reaction in the presence of low molecular alcohols under pressure, to separate the ammonia with the assistance of a stripping agent which is inert under the reaction conditions, such as a gas like nitrogen or part of the alcohol. Subsequently, before or after separating the catalyst, and after filtering off solid materials, the aryl-mono-, di- and/or polyurethane is isolated from the resultant reaction mixure. This can be done by removing the excess O-alkyl carbamate and/or the alcohol by distillation, by partially distilling off the excess O-alkyl carbamate, and/or the alcohol and crystallization, by crystallization, or by precipitating with or also by transcrystallizing from other solvents. The separated O-alkyl carbamate can be recycled if so required.

The parts referred to in the examples, which follow, are relative to parts by weight. The elementary compositions and structures were confirmed by elementary analysis, mass spectroscopy, and infra-red and nuclear magnetic resonance spectra.

EXAMPLE 1

In a reaction vessel, 93 parts of aniline with 257 parts of butyl carbamate, 0.9 parts of cobalt acetate, and 250 parts butanol are heated to 175° C. for 8 hours with a pressure of 5 bars to 15 bars being adjusted in the reactor via a pressure valve. Using 25 liters of nitrogen per liter of reaction mixture an hour, as a stripping agent, the ammonia formed during the reaction is removed continuously by means of distillation. After completed reaction, unreacted aniline, excess butanol and excess butyl carbamate are removed at approximately 20 millibars. By means of distillation at 145° C. to 148° C. and 0.1 millibar, 172 parts of phenylbutyl urethane (98 percent of theory relative to the reacted aniline) are obtained having a melting point of 80° C. to 83° C. The conversion of aniline is 91 percent.

EXAMPLE 2

In a reaction vessel, 93 parts of aniline with 450 parts of methyl carbamate, 0.9 parts of cobalt acetate and 96 parts of methanol are heated to 175° C. for 6 hours with a pressure of 5 bars to 6 bars being adjusted in the reactor via a pressure valve. The ammonia formed during the reaction is removed by batch-type distillation. After completed reaction, the reaction mixture is analyzed gas chromatographically using the internal standards method. It is determined that 140 parts of phenylmethyl urethane (98.6 percent of theory relative to reacted aniline) have formed. The conversion of aniline is 94 percent.

COMPARISON EXAMPLE

Example 2 is duplicated except a catalyst is not added to the reaction mixture. The gas chromatographical analysis shows that 113 parts of phenylmethyl urethane (88 percent of theory relative to reacted aniline) and 7 parts of N-methylaniline (7.7 percent of theory relative to reacted aniline) were formed. Eighty-five percent of the aniline was reacted.

EXAMPLE 3

In a reaction vesel, 18 parts of aniline with 36.5 parts of methyl carbamate and 0.2 part of vanadium trichloride in 75 parts of diethylene glycol dimethyl ether are heated to boiling for 3 hours. After completed reaction, the reaction mixture is analyzed gas chromatographically using the internal standards method. It is shown that 19 parts of phenylmethyl urethane were formed (73.9 percent of theory relative to reacted aniline). Eighty-eight percent of the aniline has been reacted.

EXAMPLE 4

In a reaction vessel, 93 parts of aniline with 240 parts of butyl carbamate and 0.9 parts vanadium trichloride in 86 parts butanol are heated to 135° C. to 140° C. for 16 hours. After completed reaction, the reaction mixture is analyzed by gas chromatography. It is shown that 176 parts of phenylbutyl urethane were formed (97 percent of theory relative to reacted aniline). Ninety-four percent of the aniline was reacted. By means of fractionatal distillation, 164 parts of phenylbutyl urethane are isolated at a boiling pint of 138° C. to 144° C. at 0.03 millibars.

COMPARISON EXAMPLE

Example 4 is duplicated except a catalyst is not added. The gas chromatographical analysis shows that 6.7 parts of phenylbutyl urethane were formed (87 percent of theory relative to reacted aniline). However, only 4 percent of the aniline was reacted.

EXAMPLES 5 to 35

Example 4 is duplicated except the vanadium trichloride catalyst is replaced with other compounds having metal cations as catalysts.

The catalysts used as well as the resultant yields and conversions have been compiled in the following table. The formulas in the table denote the following:

| | |
|---|---|
| $C_2H_3O_2$ | Acetate radical |
| $[(C_6H_5)_3PO]_2$ | Bis(triphenylphosphineoxide) |
| $C_2O_4$ | Oxylate radical |
| $C_{11}H_{19}O_2$ | Undecylenate radical |
| $C_5H_7O_2$ | Acetylacetaonate radical |
| $C_4H_9O$ | Butylate radical |
| $CH_3O$ | Methylate radical |
| n-$C_3H_7O$ | n-Propylate radical |
| iso-$C_3H_7O$ | iso-Propylate radical |

TABLE

| Example No. | Catalyst | Aniline Conversion % | Phenyl-Butyl-Urethane Yield % |
|---|---|---|---|
| 5 | $MnCl_2$ | 31 | 98 |
| 6 | $Mn(C_2H_3O_2)_2 \times H_2O$ | 31 | 58 |
| 7 | $Mn(C_2H_3O_2)_3 \times H_2O$ | 37 | 72 |
| 8 | $CoCl_2$ | 67 | 51 |
| 9 | $Co(C_2H_3O_2)_2 \times 4H_2O$ | 89 | 99 |
| 10 | $CoSO_4 \times 7H_2O$ | 58 | 85 |
| 11 | $Cu(NO_3)_2 \times 3H_2O$ | 33 | 72 |
| 12 | $Cu(C_2H_3O_2)_2 \times H_2O$ | 71 | 86 |
| 13 | $Cu[(C_6H_5)_3PO]_2Cl_2$ | 70 | 84 |
| 14 | Ni-naphthenate | 57 | 87 |
| 15 | $Fe(OH)(C_2H_3O_2)_2$ | 82 | 99 |
| 16 | $Fe(C_2H_3O_2)_2$ | 91 | 99 |
| 17 | $FePO_4$ | 83 | 93 |
| 18 | $Fe(C_2O_4) \times 2H_2O$ | 54 | 95 |
| 19 | $Zn(C_2H_3O_2)_2 \times 2H_2O$ | 72 | 100 |
| 20 | $ZnCl_2$ | 40 | 90 |
| 21 | $Zn(C_{11}H_{19}O_2)_2$ | 74 | 98 |
| 22 | $MoO_2(C_5H_7O_2)_2$ | 85 | 96 |
| 23 | $MlO_3$ | 64 | 88 |
| 24 | $SbCl_5$ | 87 | 88 |
| 25 | $CrCl_3$ | 69 | 97 |
| 26 | $SnCl_2$ | 90 | 88 |
| 27 | $SnCl_4$ | 92 | 79 |
| 28 | $BiCl_3$ | 47 | 85 |
| 29 | $TiCl_4$ | 50 | 98 |
| 30 | $Ti(C_4H_9O)_4$ | 64 | 94 |
| 31 | $LiC_4H_9O$ | 67 | 83 |
| 32 | $NaCH_3O$ | 16 | 99 |
| 33 | $Ca(n-C_3H_7O)_2$ | 58 | 97 |
| 34 | $Al(iso-C_3H_7O)_3$ | 67 | 93 |
| 35 | $CeO_2$ | 12 | 97 |

EXAMPLE 36

In a reaction vessel, 12.2 parts of 2,4-diaminotoluene with 22.3 parts of ethyl carbamate, 1 part of iron-(II)-acetate and 28 parts of ethanol are heated to 180° C. for 6 hours with a pressure of 14 bars to 17 bars being adjusted in the reaction vessel via a pressure valve. Using 30 liters of nitrogen per liter of reaction mixture an hour as a stripping agent, the ammonia formed during the reaction is continuously removed by means of distillation. After completed reaction, the reaction mixture is analyzed by means of high pressure liquid chromatography using the external standard method. It is determined that 19 parts of 2,4-bis(ethoxycarbonylamino)toluene (73.6 percent of theory relative to reacted 2,4-diaminotoluene) and 3.6 parts of a mixture of 2-amino-4-(ethoxycarbonylamino)toluene and 4-amino-2-(ethoxycarbonylamino)toluene (19.1 percent of theory relative to reacted 2,4-diaminotoluene) have been formed. Ninety-seven percent of the 2,4-diaminotoluene has been converted.

In order to isolate the 2,4-bis(ethoxycarbonylamino)-toluene, the excess ethanol and excess ethyl carbamate are reduced by distillation under reduced pressure at 10 millibars. The residue is dissolved in 250 parts of methylene chloride, and is washed repeatedly with water. Following this, the methylene chloride is separated, 50 parts of ethanol are added, and the mixture is allowed to cool in an ice-sodium chloride mixture. Eventually, 2,4-bis(ethoxycarbonylamino)toluene will crystallize having a melting point of 108° C. to 110° C.

EXAMPLE 37

In a reaction vessel, 7.9 parts of 1,5-diaminonaphthaline with 24.5 parts of ethyl carbamate, 3 parts of urea, 0.15 part of uranyl acetate, and 34 parts of ethanol are heated to 180° C. for 12 hours with a pressure of 16 bars to 18 bars being adjusted within the reactor via a pressure valve. Using 20 liters of nitrogen per liter of reaction mixture an hour as a stripping agent, the ammonia formed during the reaction is continuously removed by means of distillation. After completed reaction, the reaction mixture is analyzed by high pressure liquid chromatography using the external standard method. It is determined that 9 parts of 1,5-bis-(ethoxycarbonylamino)naphthalene (83.9 parts of theory relative to reacted 1,5-diaminonaphthalene) have been formed having a melting point of 221° C. to 224° C. Seventy-one percent 1,5-diaminonaphthalene has been converted.

EXAMPLE 38

In a reaction vessel, 120 parts of 3,5-dichloroaniline with 220 parts of methyl carbamate and 6 parts of cobalt acetate in 100 parts of diethylene glycol dimethyl ether are heated under reflux for 10 hours. After completed reaction, excess methyl carbamate and diethylene glycol dimethyl ether are removed by means of distillation under reduced pressure at 15 millibars. The residue is dissolved in 500 parts of methylene chloride, is mixed with 60 parts of 10 percent sulfuric acid, and is washed 3 times with 100 parts of water. The organic phase is dried and concentrated resulting in 123 parts of 3,5-dichlorophenylmethyl urethane (90.9 percent of theory relative to converted 3,5-dichloroaniline) having a melting point of 117° C. to 119° C. Eighty-three percent of the 3,5-dichloroaniline has been converted.

EXAMPLE 39

In a reaction vessel 10.0 parts of 4,4'-diaminodiphenylmethane with 143 parts of octyl carbamate, 6 parts of urea and 0.3 part of cobalt acetate are heated to boiling in 150 parts of octanol for 6 hours. Using 10 liters of nitrogen per liter of reaction mixture an hour as a stripping agent, the ammonia formed during the reaction is continuously removed by means of distillation. After cooling, 16 parts of 4,4'-bis(octoxycarbonylamino)diphenylmethane crystallize (71.4 percent of theory relative to reacted 4,4'-diaminodiphenylmethane) having a melting point of 117° C. to 119° C. Eighty-seven percent of the 4,4''-diaminodiphenylmethane has been converted. The mother liquor still contains 4-amino-4'-(octoxycarbonylamino)diphenylmethane.

EXAMPLE 40

One proceeds according to the data in Example 39 without using additional urea. Obtained are 11 parts of 4,4'-bis(octoxycarbonylamino)diphenylmethane (61.9 percent of theory relative to reacted 4,4'-diaminodiphenylmethane). Sixty-nine percent of the 4,4'-diaminodiphenylmethane was converted.

EXAMPLE 41

In a reaction vessel, 15 parts of a commercially-available mixture of 2,2'-, 2,4'- and 4,4'-diaminodiphenylmethane and polyphenylpolymethylene polyamines with 40 parts of ethyl carbamate and 0.5 part of cobalt acetate in 70 parts of ethanol are heated to 190° C. to 195° C. for 8 hours with a pressure of 18 bars to 20 bars being adjusted in the reactor via a pressure valve. Using 25 liters of nitrogen per liter of reaction mixture an hour as a stripping agent, the ammonia formed during the reaction is continuously removed by means of distillation. The mixture is allowed to cool and excess ethanol and excess ethyl carbamate are removed by distallation under reduced pressure at 10 millibars. The residue is washed with water, is dried and is mixed with cyclohexane, and is agitated. This results in a powdery precipitate which is separated and analyzed by means of high pressure liquid chromatography. It is determined that a mixture of 2,4'-, 2,2'- and 4,4'-bis(ethoxycarbonylamino)diphenylmethane and polyphenylpolymethylene polyethylurethane has been formed containing the same components as a comparison product produced from a mixture of 2,4'-, 2,2'- and 4,4'-diisocyanatodiphenylmethane and polyphenylpolymethylene polyisocyanates with ethanol.

EXAMPLE 42

In a reaction vessel, 22 parts of 3-aminophenol with 100 parts of ethyl carbamate, 12 parts of urea, 1 part of zinc-(II)-acetate and 45 parts of ethanol are heated to 180° C. to 185° C. for 8 hours with a pressure of 7 bars to 8 bars being adjusted in the reactor via a pressure valve. Using 20 liters of nitrogen per liter of reaction mixture an hour as a stripping agent, the ammonia formed during the reaction is continuously removed by means of distillation. After completed reaction, the reaction mixture is analyzed by means of gas chromatography using the internal standard method. It is determined that 29 parts of 3-ethoxycarbonylaminophenol (90.2 percent of theory relative to reacted 3-aminophenol) were formed. Eighty-eight percent of the 3-aminophenol was reacted.

EXAMPLE 43

In a reaction vessel, 61 parts of 2,4-diaminotoluene with 432 parts of octyl carbamate and 1.5 parts of sodium methanolate in 1950 parts of octanol are heated to the boiling point (195° C.). After 23 hours, the mixture is allowed to cool and excess octanol and excess octyl carbamate is removed by distillation to a sump temperature of 180° C. Using high pressure liquid chromatography, the residue is analyzed using the external standard method. It is determined that 57 percent of the 2,4-diaminotoluene reacted, resulting in 101 parts (81.7 percent of theory) of 2,4-bis(octoxycarbonylamino)toluene, $C_{25}H_{42}O_4N_2$ (molecular weight 434) and 10.9 parts (13.8 percent of theory) of a mixture consisting of 2-amino-4-(octoxycarbonylamino)toluene and 4-amino-2-(octoxycarbonylamino)toluene.

EXAMPLE 44

In a reaction vessel, 40 parts of 2,4-dimainotoluene with 240 parts of hexyl carbamate, 1.5 parts cobalt acetate, and 170 parts of hexanol are heated to 155° C. to 175° C. for 15 hours with the resultant ammonia being removed continuously by means of distillation. After completed reaction, the reaction solution is examined by means of high pressure liquid chromatography using the external standards method. It is found that the 2,4-diaminotoluene is completely converted resulting in 119 parts of 2,4-bis(hexoxicarbonylamino)toluene (96 percent of theory relative to the reacted 2,4-diaminotoluene).

EXAMPLE 45

In a reaction vessel, 100 parts of a commercially-available crude MDA mixture, 46 percent of which consists of diaminodiphenylmethane and 54 percent of which consists of polyphenylpolymethylene polyamines with 30.3 parts of urea, 300 parts of hexyl carbamate, 1.5 parts of cobalt acetate and 260 parts of hexanol are heated to 155° C. to 175° C. for 25 hours with the resultant ammonia being removed continuously by means of distillation. After completed reaction, the reaction solution is examined by means of high pressure liquid chromatography which shows that a mixture of bis(hexoxycarbonylamino)diphenylmethanes and poly(hexoxycarbonylamino)polyphenylpolymethanes has been formed which is identical with a comparison product produced from a mixture of diphenylmethanediisocyanates and polyphenylpolymethylene polyisocyanates and hexanol.

EXAMPLE 46

In a reaction vessel, 50 parts of 4,4'-diaminodiphenylmethane with 360 parts of hexyl carbamate, 1 part of cobalt acetate and 260 parts of hexanol are heated to 155° C. to 175° C. The mixture is agitated at 155° C. to 175° C. for 27 hours. After cooling, the mixture is filtered off the precipitated catalyst and is analyzed by high pressure liquid chromatography using the external standard method. It is found that the 4,4'-diaminodiphenylmethane is completely reacted resulting in 108 parts of 4,4'-bis(hexoxycarbonylamino)diphenylmethane (94.2 percent of theory relative to reacted 4,4'-dimainodiphenylmethane). The reaction solution further contains some 4-amino-4'-(hexoxycarbonylamino)diphenylmethane.

The embodiments of this invention in which an exclusive property or privilege is claimed are defined as follows:

1. A process for the manufacture of an aryl mono-, di- and/or polyurethane comprising the steps of
   A. reacting a primary aromatic mono-, di- and/or polyamine with a carbomate of the formula H$_2$N—COOR in which R represents an unsubstituted or substituted aliphatic, cycloaliphatic or aromatic-aliphatic radical in the presence of an alcohol and at least one compound containing one or more cations of metals of groups IA, IB, IIA, IIB, IIIA, IIIB, IVA, IVB, VA, VB, VIB, VIIB, VIIIB of the periodic system as catalysts, and
   B. separating the ammonia and other by-products from the aryl mono, di-, and/or polyurethane.

2. The process of claim 1 wherein the raw materials are reacted in such quantities that the ratio of amino groups of the aromatic mono-, di- and polyamine to carbamate to hydroxyl groups of the alcohol is 1:0.5–20-:0–100.

3. The process of claim 1 carried out in the presence of urea with the mole ratio of urea to alcohol being equal to or less than 1.

4. The process of claim 3 wherein a maximum of 1.5 equivalents of urea relative to the amino groups of the mono-, di- and polyamines is used in addition to the carbamate.

5. The process of claim 1 or 2 wherein the monoamine is selected from the group consisting of aniline, 3-hydroxyaniline, and 3,5-dichloroaniline.

6. The process of claim 1 or 2 wherein the diamine is selected from the group consisting of 2,4- and 2,6-diaminotoluene, the corresponding isomer mixtures thereof, 1,5-diaminonaphthalene, 3,3+-ditolulene-4,4'-diamine, 2,2'-, 2,4'- and 4,4'-diaminodiphenylmethane and the corresponding isomer mixtures thereof.

7. The process of claim 1 or 2 wherein the aromatic polyamine is a mixture of diaminodiphenylmethanes and polyphenylpolymethylene polyamines.

8. The process of claim 1 wherein the carbamates are those of carbamic acids and aliphatic and cycloaliphatic monoalcohols having 1 to 10 carbon atoms in the alcohol radical.

9. The process of claim 1 wherein the alcohol used has an alkyl group which corresponds with the alkyl group of the carbamate.

10. The process of claim 1 wherein compounds containing cations of the metals lithium, calcium, aluminum, tin, bismuth, antimony, copper, zinc, titanium, vanadium, chromium, molybdenum, manganese, iron, and cobalt are used as catalysts.

11. The process of claim 1 wherein the reaction is carried out at temperatures above 120° C.

12. The process of claim 1 wherein the resultant ammonia is simultaneously separated.

* * * * *

UNITED STATES PATENT AND TRADEMARK OFFICE
CERTIFICATE OF CORRECTION

PATENT NO. : 4,278,805
DATED : July 14, 1981
INVENTOR(S) : Franz Merger and Friedrich Towae It is certified that error appears in the above-identified patent and that said Letters Patent are hereby corrected as shown below:

Column 13, Claim 1, line 4, correct spelling of carbomate to "carbamate".

Column 14, Claim 6, line 4, change 3,3+ to "3,3'".

Signed and Sealed this

Thirteenth Day of October 1981

[SEAL]

Attest:

Attesting Officer

GERALD J. MOSSINGHOFF

Commissioner of Patents and Trademarks